United States Patent Office 3,193,659
Patented July 6, 1965

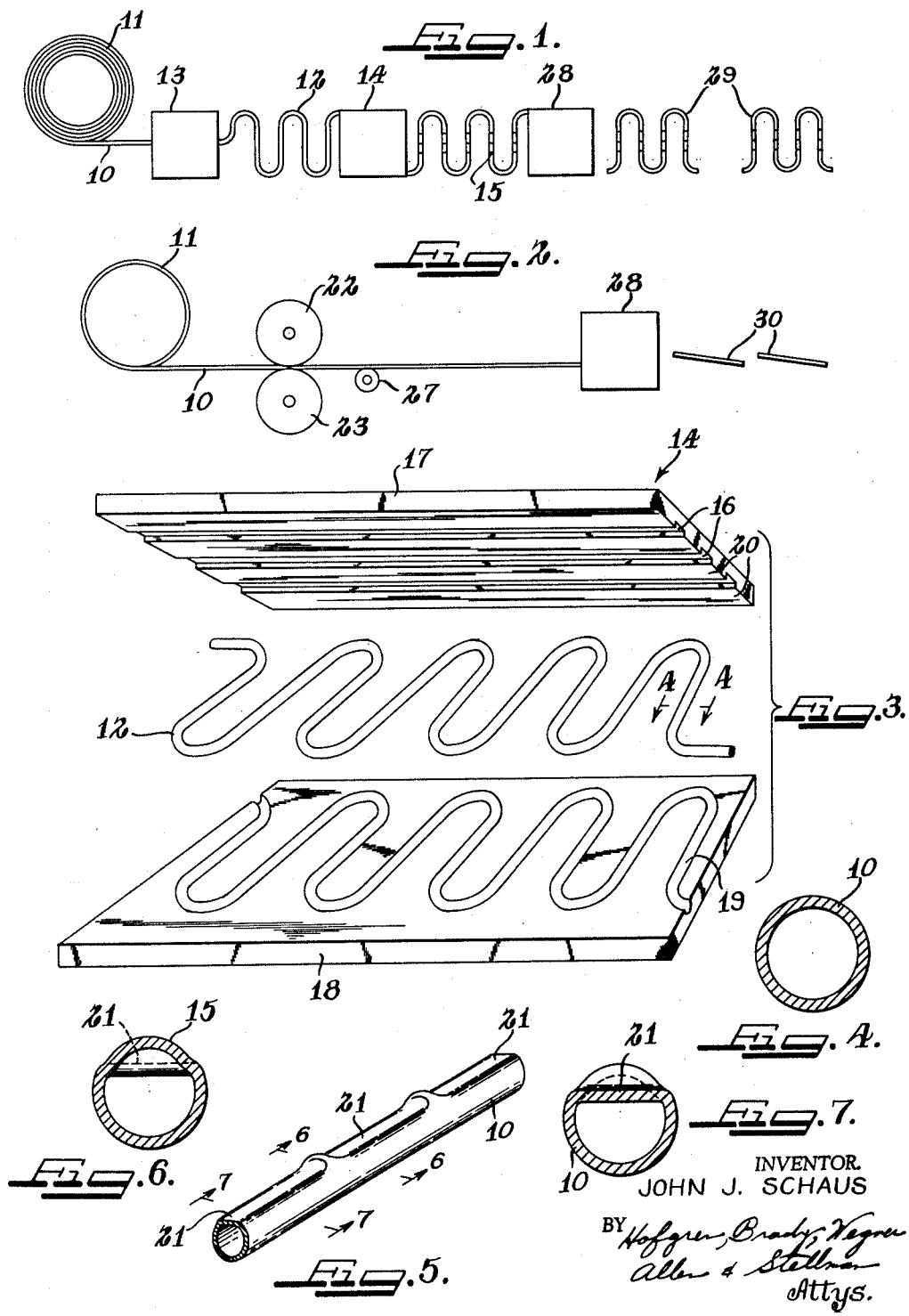

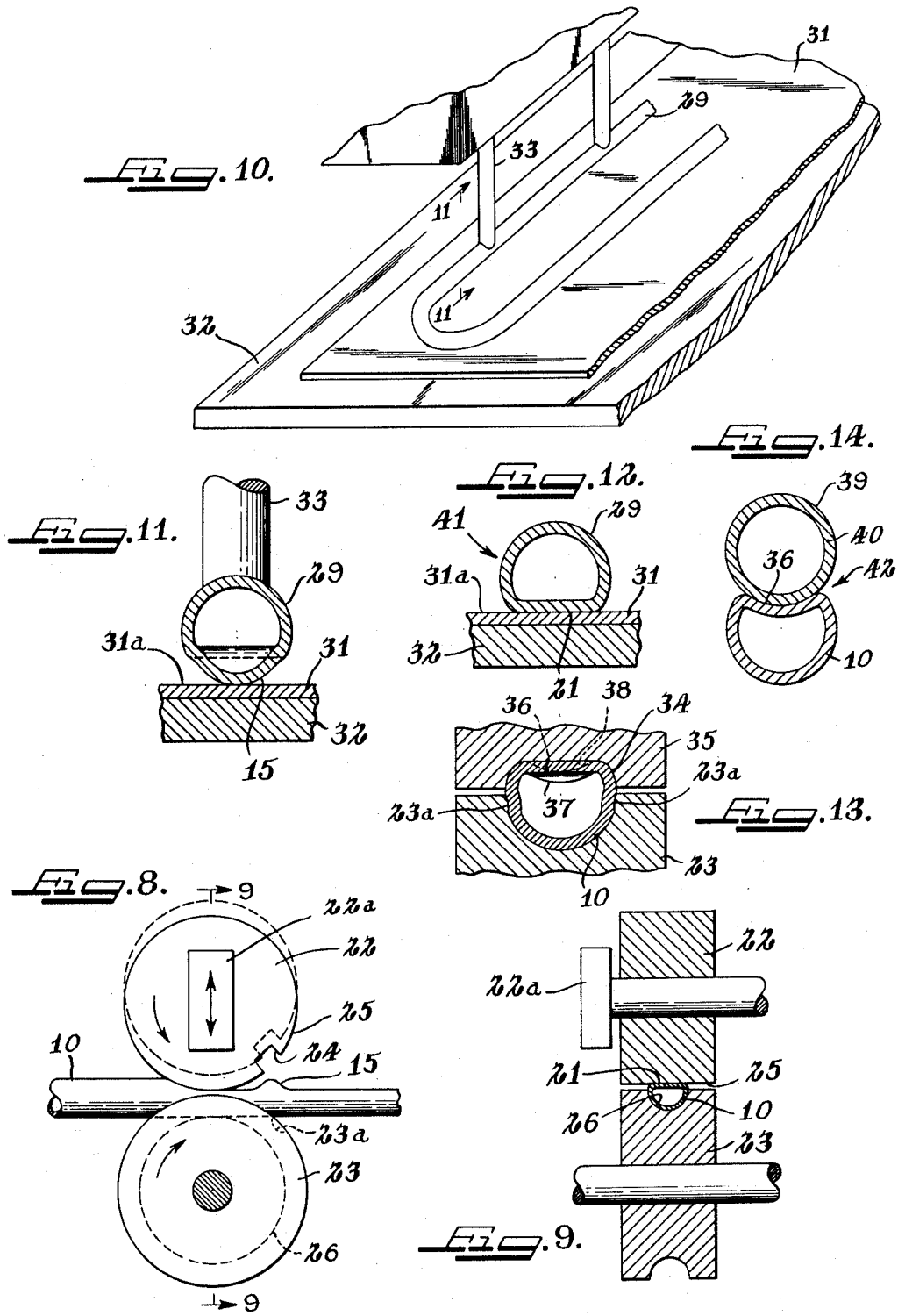

3,193,659
D-SECTION TUBING WITH WELDING PROJECTIONS THEREON AND METHOD OF FORMING THE SAME
John J. Schaus, Evansville, Ind., assignor to Whirlpool Corporation, a corporation of Delaware
Filed Mar. 26, 1962, Ser. No. 182,365
9 Claims. (Cl. 219—117)

This invention relates to the art of welding, and in particular to an improved method of arranging elements for facilitated electric welding.

In one improved method of electric welding, one of the elements to be electrically welded to another of the elements is provided with a plurality of projections extending toward the other element. During the welding operation, the projections are fused to join the two elements together thereat, with the adjacent portions of the one element being brought into facial engagement with the confronting portions of the other element. A number of different methods of forming the projections in the element are presently known in the art. The known methods, however, have serious disadvantages, such as the requirement of insertion of forming devices within the element to be provided with the projections, relatively costly time-consuming operations, and arrangements wherein only limited engagement between the elements is obtained by the welding process, particularly where one of the elements is a tubular element. Thus, this welding method has limited application in the field of heat exchangers, such as where tubular conduits are welded to flat plates, as the heat transfer efficiency is limited by the limited surface engagement between the elements.

The present invention comprehends an improved welding method eliminating the above discussed disadvantages of the present methods in a novel, simple, and economical manner. The invention further comprehends improved articles of manufacture comprising an improved arrangement of the one element provided with the welding projections, and an improved resultant welded structure.

Thus, a principal feature of the present invention is the provision of a new and improved method of manufacture of means for use in a welding process.

Another feature of the invention is the provision of a new and improved article of manufacture for use in a welded structure.

A further feature of the invention is the provision of such a method of manufacture comprising the steps of providing an elongate duct formed of a weldable material, constrictively deforming the duct along a first preselected portion thereof, and constrictively deforming the duct along a second preselected portion thereof spaced longitudinally from the first portion to define therebetween an outwardly projecting weld portion.

Still another feature of the invention is the provision of such a method of manufacture wherein the duct is arranged prior to the constricted deformation in a preselected non-rectilinear path.

A further feature of the invention is the provision of such a method wherein the projections are formed by means of a grooved plate pressed against the first element.

Again, another feature of the invention is the provision of such a method of manufacture wherein the first element comprises a tube, and the projections are formed therein by passing the tube against a notched roller.

Still another feature of the invention is the provision of such an article of manufacture comprising a tube having a first preselected portion, a second preselected portion spaced longitudinally from the first portion, and a third portion between the first and second portions defining a weld projection, the first and second portions having D-shaped cross-sections.

Another feature of the invention is the provision of such an article of manufacture wherein the tube is firstly arranged with its longitudinal axis extending in a preselected non-rectilinear path.

A still further feature of the invention is the provision of a heat exchanger comprising a sheet defining one wall of a heat exchanger, and a tube defining another wall of the heat exchanger, the tube having a D-shaped cross section defining a flat portion with the flat portion of the tube being disposed in facial engagement with the sheet.

Other features and advantages of the invention will be apparent from the following description taken in connection with the accompanying drawings wherein:

FIGURE 1 is a schematic elevation illustrating one method of manufacture embodying the invention;

FIGURE 2 is a schematic elevation illustrating another method of manufacture embodying the invention;

FIGURE 3 is an exploded perspective view illustrating the forming step in the method illustrated in FIGURE 1;

FIGURE 4 is a transaxial section of the tubing taken substantially along the line 4—4 of FIGURE 3;

FIGURE 5 is a fragmentary perspective view of the tubing subsequent to the forming step illustrated in FIGURE 3;

FIGURE 6 is a transaxial section taken substantially along the line 6—6 of FIGURE 5;

FIGURE 7 is a transaxial section taken substantially along the line 7—7 of FIGURE 5;

FIGURE 8 is a schematic elevation illustrating the forming step in the method illustrated in FIGURE 2;

FIGURE 9 is a vertical section taken substantially along the line 9—9 of FIGURE 8;

FIGURE 10 is a fragmentary perspective view illustrating the welding of the preformed tubing to the sheet element;

FIGURE 11 is an enlarged vertical section taken substantially along the line 11—11 of FIGURE 10;

FIGURE 12 is a section similar to that of FIGURE 11 illustrating the arrangement of the tube and the sheet subsequent to the welding operation;

FIGURE 13 is a section illustrating a modified deformation of the tubing; and

FIGURE 14 is a transaxial section illustrating the welded association of the tubing of FIGURE 13 with a tubular second element.

In the exemplary embodiment of the invention as disclosed in the drawing, an improved welding technique is shown to comprise the steps of constrictively deforming a first element so as to provide a plurality of spaced welding projections adapted for use in resistance welding the element to another element in an improved efficient and simple manner. The inventive concept includes the formation of the first element for improved facial engagement thereof with the element to which it is to be welded, and, thus, comprehends an improved structural association of the two elements as for facilitated heat transfer therebetween.

More specifically, as illustrated in FIGURE 1, the invention comprehends a first method of manufacture wherein a first element 10, herein a metallic tubular conduit, is provided as in a supply roll 11. The conduit 10 may be preformed to have its axis define a preselected non-rectilinear path, and in FIGURE 1, the conduit is shown to be preformed more specifically in a serpentine arrangement 12 by means of a suitable conventional bending apparatus 13. It should be understood, however, that the invention may be employed with the first element 10 arranged rectilinearly, or in any other non-rectilinear arrangement as desired.

As shown in FIGURE 1, the serpentine arrangement 12 of the conduit 10 may be such that the serpentine path of the axis of the tube lies in a single plane. This planar arrangement is best seen in the illustration of FIGURE 3. As illustrated, the tubing is delivered to a projection forming apparatus 14 wherein the tubing is constrictively deformed to provide therein a plurality of longitudinally spaced outwardly projecting welding projections 15. In the apparatus 14 illustrated in FIGURE 3, the projections are formed by means of recesses such as grooves 16 provided in an upper plate 17. The upper plate is urged forcibly toward a lower plate 18 carrying the serpentine conduit arrangement 12 in a corresponding upwardly opening serpentine groove 19. Thus, the lands 20 at the sides of the grooves 16 press the tubing along spaced longitudinal portions thereof to flatten it, thereby defining a plurality of planar surfaces 21 with the portions between the planar surfaces 21 remaining relatively undeformed to define the weld projections 15. As best seen in FIGURES 6 and 7, the tube is essentially D-shaped in cross section transaxially of surfaces 21, and is generally annular transaxially of projections 15.

Alternatively, the tubing 10 may be delivered from a roll 11 to between a pair of rollers 22 and 23 to provide the constrictive deformation. This method of forming the tube is generally illustrated in FIGURE 2, and more specifically, illustrated in FIGURES 8 and 9. Thus, as best seen in FIGURE 8, the upper roller 22 may be provided with a suitable notch 24. As the tube 10 is moved longitudinally between the rollers 22 and 23, the rollers are suitably rotated. The upper roller may be provided with a cylindrical periphery 25 in which notch 24 is provided, and the lower roller 23 may be provided with a concave peripheral portion 26 to receive the tubing 10. Thus, as shown in FIGURE 9, the upper surface of the tubing 10 is deformed by the upper roller 22 to define the planar surfaces 21, and causes the tube to be deformed to a generally D-shaped cross section. However, at each point along the length of the tube 10 where the notch 24 confronts the tubing in the rotation of the roller 22, the tubing remains substantially undeformed, thereby effectively defining the weld projections 15. At spaced areas along the tube 10, it may be desired to permit the tube to remain undeformed such as for coupling purposes. To this end, the roller 22 may be carried on a vertically movable device 22a arranged to space, at preselected times, the roller 22 from roller 23 sufficiently to permit the tube 10 to remain substantially undeformed. To facilitate the flow of the material in duct 10 in forming the projections 15, the lower roller 23 may be provided with small lugs or projections 23a arranged to engage the tubing circumferentially adjacent the portion being formed into the weld projections.

If desired, the tubing with the weld projections 15 provided therein may be passed against a straightening roller 27 subsequent to the projection forming operation. The formed tubing may be delivered to a suitable forming and/or cutoff device 28, as illustrated in FIGURES 1 and 2, for cutting of the tubing into discrete elements 29 and 30, respectively.

The invention has heretofore been described as including the different operations of: (a) forming the tubing in a preselected non-rectilinear path; (b) forming spaced weld projections in the tubing; and (c) forming the tubing into discrete elements. Obviously, the order of the steps need not be a–b–c, but may equally as well be a–c–b, b–a–c, b–c–a, c–a–b, and c–b–a as desired. Alternatively, the different steps may be performed concurrently if desired. Further, as indicated above, step (a) may be omitted where the tubing is to be utilized substantially straight. Also, the tubing may be singly subjected to step (b) and utilized as a supply for subsequent operations if so desired.

The formed elements 29 and 30 may now be arranged in association with the element to which they are to be welded to complete the manufacture. This phase of the operation is illustrated in FIGURES 10 through 14. More specifically, as shown in FIGURE 10, it is assumed that the preformed elements 29 are to be welded to a flat sheet element 31. To effect this welding operation, the sheet element 31 is placed on a suitable welding bed 32, and the serpentine element 29 is laid on the sheet element 31 with the weld projections 15 extending downwardly to engage the upper surface of the sheet element, as best seen in FIGURE 11. Suitable welding electrodes 33 are brought into engagement with the element 29, as shown in FIGURE 11, and electrical current passed from the electrodes through the element 29 to the bed 32 to effect a welding fusion of the weld projections 15, whereby the element 29 is welded firmly to the sheet 31. As shown in FIGURE 12, the fusion of the weld projections 15 causes the element 29 to move downwardly so as to bring the planar surfaces 21 thereof into facial engagement with the upper surface 31a of the sheet 31 providing improved thermal transfer between the sheet 31 and element 29.

Alternatively, as shown in FIGURES 13 and 14, the tubing 10 may be deformed as by providing a suitable concave die surface 34 in an upper roller 35 (as in the step illustrated in FIGURE 8) to deform the upper portion of the tubing 10 to define a concave upper surface 36 from which welding projections 37 project, being formed in the tubing by a suitable notch 38 in the groove 34. Thus, the surface 36 may be complementary to the outer surface 39 of a tube 40 to which the tubing 10 is to be welded, and when electrical current is passed through the tubing 10 and the tube 40, the fusion of the welding projections 37 permits the tubing 10 and the tube 40 to be welded together with the surfaces 36 and 39 in efficient thermal transfer association.

Thus, the invention comprehends an improved facilitated method of forming one element, such as tubing 10, with a plurality of welding projections, such as projections 15, by means of constrictive deformation of the tubing. By suitably constrictively deforming the tubing to define preselected deformed surface configurations adjacent the weld projections, an improved efficient thermal transfer surface engagement with an associated element, such as the flat sheet 31 in FIGURE 12 or the tube 40 in FIGURE 14, may be readily obtained. The resultant improved heat transfer structures 41 in FIGURE 12 and 42 in FIGURE 14 have resultant desirable features of effectively maximum economy of manufacture with effectively maximum efficiency of heat transfer.

It is obvious that the invention may be utilized with elements having shapes differing from the specific shapes shown in illustrating the invention, and that other suitable surface configurations for providing the improved thermal transfer association may be provided in conformity with the invention.

While I have shown and described certain embodiments of my invention, it is to be understood that it is capable of many modifications. Changes, therefore, in the construction and arrangement may be made without departing from the spirit and scope of the invention as defined in the appended claims.

I claim:

1. A method of manufacture comprising the steps of: providing an elongate duct formed of a fusibly weldable material; and passing the duct longitudinally between a pair of forming rolls having axially parallel, annular peripheral forming portions, one of which forming portions is provided with a notch to constrictively deform the duct along a first preselected portion thereof and to constrictively deform the duct along a second preselected portion thereof spaced longitudinally from said first portion, said notch being arranged to define between said preselected duct portions an outwardly projecting weld portion, the other of said forming portions being provided with a projection arranged to engage the duct transversely adjacent the portion aligned with the notch to urge the duct material to said weld portion.

2. A method of manufacture comprising the steps of: providing an elongate duct formed of a fusibly weldable material and having an outer concave, cylindrical surface; and providing on said concave surface substantially completely fusible weld portions projecting outwardly therefrom.

3. A method of manufacture comprising the steps of: applying constrictive die means to a tubular first member to form therein a transversely inwardly deformed portion extending longitudinally of the member and having at spaced intervals projections extending transversely outwardly from the member with the portion of the tubular member diametrically opposite said inwardly deformed portion being substantially undeformed; and fusing said projections to a second member having a portion conforming to said inwardly deformed portion of said first member to have said portion of the second member in surface engagement with said deformed portion of said first member.

4. The method of claim 3 wherein said die means comprises a pair of forming rolls having axially parallel, annular peripheral forming portions, one of which forming portions is provided with a notch to form said projections and the other of which forming portions is arranged to maintain said opposite portion of the tubular member undeformed.

5. The method of claim 3 wherein said die means are arranged to provide a flat, planar deformed portion of said tubular member.

6. The method of claim 3 wherein said second member portion and said deformed portion of said first member are respectively concavely and convexly cylindrical.

7. The method of manufacture of claim 3 wherein the first member is formed with the axis thereof defining a serpentine path.

8. A welded structure comprising: a tubular first member formed by applying constrictive die means thereto to form therein a transversely inwardly deformed portion extending longitudinally of the member and having at spaced intervals projections extending transversely outwardly from the member with the portion of the tubular member diametrically opposite to said inwardly deformed portions being substantially undeformed; and a second member having said projections fused thereto and having a portion conforming to said inwardly deformed portion of said first member to have said portion of the second member in surface engagement with said deformed portion of said first member.

9. A method of manufacture comprising the steps of: providing an elongate duct formed of a fusibly weldable material; forming the duct with the axis thereof defining a preselected path and with preselected portions thereof defining outwardly projecting fusible weld portions; juxtaposing the duct to an element to which the duct is to be welded with the weld portions engaging the element; and passing a welding current through the weld portions to cause a welding fusion of substantially the complete weld portions to secure the duct to the element with the duct being disposed in substantial facial engagement with the element along substantially its entire length, said preselected portions being deformed to define concave aligned segmentally cylindrical surfaces and said element defining a cylindrical surface with which said segmentally cylindrical surfaces are engaged.

References Cited by the Examiner

UNITED STATES PATENTS

| | | | |
|---|---|---|---|
| 528,661 | 11/94 | Engel | 219—149 |
| 1,448,001 | 3/23 | Refior | 80—58 |
| 2,306,772 | 12/42 | Benson | 219—107 X |
| 2,320,041 | 5/43 | McCormick | 219—93 X |
| 2,333,600 | 11/43 | Trautvetter | 219—107 X |
| 2,433,731 | 12/47 | Brinen | 29—157.3 |
| 2,691,813 | 10/54 | Polad | 29—157.3 |
| 2,999,146 | 9/61 | Kaplan et al. | 219—93 |
| 3,104,312 | 9/63 | Gentry | 219—93 X |

RICHARD M. WOOD, *Primary Examiner.*